United States Patent [19]

Uelzmann

[11] 3,716,557

[45] Feb. 13, 1973

[54] 1,2-EPITHIO-3-(β-CYANOETHOXY)PROPANE

[75] Inventor: Heinz Uelzmann, Cuyahoga Falls, Ohio

[73] Assignee: The General Tire & Rubber Company

[22] Filed: March 30, 1970

[21] Appl. No.: 24,001

Related U.S. Application Data

[63] Continuation-in-part of Ser. No. 806,777, Feb. 28, 1969.

[52] U.S. Cl. ............. 260/327 E, 252/8.1, 260/13, 260/30.4, 260/37, 260/45.7, 260/79.7, 260/348, 260/830, 260/858
[51] Int. Cl. ............. C07d 59/00, C07d 1/00
[58] Field of Search ............. 260/327 E, 348

[56] References Cited

UNITED STATES PATENTS 2,949,474   8/1960   Murdoch et al. .................. 260/348
3,410,810   11/1968   Tucker .................................. 260/2

OTHER PUBLICATIONS

Lowy, et al., Int. Org. Chem. (N.Y. 1945), p. 213–215.
Houben–Weyl, Band VI/3 (G. Thieme Verlag, Stuttgart, 1965), p. 21–22.

*Primary Examiner*—Henry R. Jiles
*Assistant Examiner*—Cecilia M. Jaisle
*Attorney*—Kemon, Palmer & Estabrook, Frank C. Rote, Jr. and Denbigh S. Matthews

[57] ABSTRACT

Compounds having terminal oxirane groups are formed by reaction of glycidol, under base-catalyzed conditions, with vinyl-type compounds, e.g., acrylonitrile, acrylic esters, vinyl ketones, vinyl sulfones and the like. The resulting products can be converted to terminal thiirane group compounds by reaction with thiocyanates. The compounds are useful as comonomers in production of copolymers and as cure accelerators for epoxy-amine resinous compositions.

1 Claim, No Drawings

1,2-EPITHIO-3-(β-CYANOETHOXY)PROPANE

This application is a continuation-in-part of prior copending U.S. Pat. application of Heinz Uelzmann, Ser. No. 806,777, filed Feb. 28, 1969.

Because of the large quantities of epoxy resinous compositions which are being commercially used for a wide variety of applications and the excellent prospects for still further growth in quantities and uses of these compositions, extensive work has been devoted to developing new forms of these compositions and components for use in their preparation. Such development work has included investigation of the utility of various materials as comonomers in the production of the epoxy resinous compositions and as accelerators or catalysts for the curing of these materials. The present invention is concerned with new developments of this type in the field of epoxy resinous compositions.

Many thousands of compounds containing epoxy groups have been investigated as ingredients in the production of epoxy resinous compounds. Many of these are of rather complex nature (see U.S. Pat. No. 2,857,362), but more extensive use in production of commercial products probably involves more simple components such as glycidol and some of its relatively simple esters and ethers (see U.S. Pat. Nos. 2,795,572; 2,895,947 and 2,925,426).

Notwithstanding the great amount of work which has been performed in preparing new organic compounds and investigating their usefulness as components for resinous compositions, new low cost epoxy compounds are needed from which epoxy resinous compositions may be formulated at costs below those prevailing for present products of this class. Additionally, improvements in these products permitting them to be cured more rapidly at relatively low temperatures would help to further expand the utilization of such materials for a variety of applications.

The principal object of this invention is the provision of new oxirane and thiirane terminal group compounds. Further objects include the provision of new methods for the production of terminal oxirane compounds; new forms of catalyzed epoxy resinous compositions capable of rapid curing at relatively low temperatures; new epoxy compounds of relatively low cost produced from glycidol; and epoxy-amine adhesives having improved curing properties and bonding strength.

Other objects and further scope of applicability of the present invention will become apparent from the detailed description given hereinafter.

The foregoing objects are in part accomplished in accordance with the invention by the provision of new epiterminal organic compounds having the following general formula:

$$CH_2\underset{X}{-}CH-CH_2-O-Z$$

wherein
X is oxygen or sulfur,

Z is $-CH_2-CH_2-CN-$ when X is sulfur, $R\overset{O}{\overset{\|}{C}}OR'$,
$-CH_2-CH_2-SO_2-R'$, $-CH_2-CH_2-SO_2-CH_2-CH_2-O-CH_2-$
$-CH\underset{X}{-}CH_2$ $-CH_2-CH_2-CO-R'$, $-CH_2-CH_2-CO-CH_2-CH_2-O-$
$CH_2-CH\underset{X}{-}CH_2$, or $-R\overset{O}{\overset{\|}{C}}O-(R''-O)_y-\overset{O}{\overset{\|}{C}}R-O-CH_2-CH\underset{X}{-}CH_2$ and
where
 R is an alkylene radical of from two to seven carbon atoms,
 R' is an alkyl radical of from one to eight carbon atoms, and
 R'' is an alkylene radical of from one to eight carbon atoms when y is 1 or R'' is an alkylene radical of from two to eight carbon atoms when y is a number from 2 to 9.

The objects are further accomplished by the new method of producing terminal oxirane compounds having the formula:

$$CH_2\underset{O}{-}CH-CH_2-O-Z$$

wherein

Z is $-CH_2-CH_2-CN$, $R\overset{O}{\overset{\|}{C}}OR'$, $-CH_2-CH_2-SO_2-R'$,
$-CH_2-CH_2-SO_2-CH_2-CH_2-O-CH_2-CH\underset{O}{-}CH_2$, $-CH_2-CH_2-CO-R'$, $-CH_2-CH_2-CO-CH_2-CH_2-O-$
$CH_2-CH\underset{O}{-}CH_2$, or $R\overset{O}{\overset{\|}{C}}O-(R''-O)_y-\overset{O}{\overset{\|}{C}}R-O-CH_2-$ $CH\underset{O}{-}CH_2$, and where
 R is an alkylene radical of from two to seven carbon atoms,
 R' is an alkyl radical of from one to eight carbon atoms, and
 R'' is an alkylene radical of from one to eight carbon atoms when y is 1 or R'' is an alkylene radical of from two to eight carbon atoms when y is a number from 2 to 9 which comprises reacting glycidol, in the presence in catalytic amounts of an alkaline compound, with at least one vinyl-type compound selected from the group having the formulas:

$$H_2C=CHCN, \ SO_2(-CH=CH_2)_2, \ CH_2=CH-\overset{O}{\underset{\overset{\|}{O}}{S}}-R',$$

$$CO(-CH=CH_2)_2, \ CH_2=CH-\overset{O}{\overset{\|}{C}}-R', \ HR'''C=CR''''-\overset{O}{\overset{\|}{C}}-O-R',$$

$$\text{and } HR'''C=CR''''-\overset{O}{\overset{\|}{C}}-O-\left(R''-O\right)_y-\overset{O}{\overset{\|}{C}}-R''''C=CR'''H$$

where
 R' is an alkyl radical of from one to eight carbon atoms,
 R'' is an alkylene radical of from one to eight carbon atoms when y is 1 or R'' is an alkylene radical of from two to eight carbon atoms when y is a number from 2 to 9,
 R''' is hydrogen or an alkyl radical, and
 R'''' is hydrogen, methyl or ethyl, the maximum total number of carbon atoms of R''' + '''' being equal to five.

The objects are still further accomplished through the creation of new catalyzed epoxy resinous compositions capable of rapid curing at relatively low temperatures which comprise:

A. at least one curing agent selected from the group consisting of primary and secondary amines, and B. at least one thiirane compound, preferably of the formula:

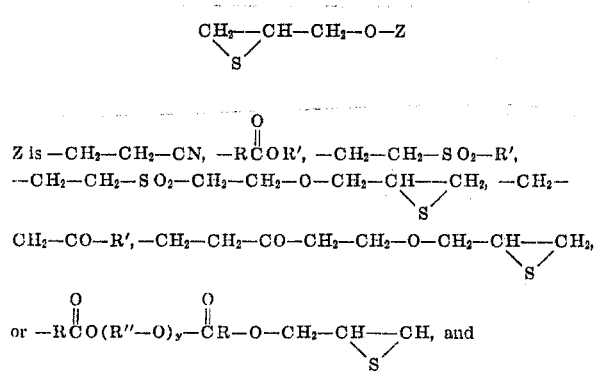

where
R is an alkylene radical of from two to seven carbon atoms,
R' is an alkyl radical of from one to eight carbon atoms, and
R'' is an alkylene radical of from one to eight carbon atoms when y is 1 or R'' is an alkylene radical of from two to eight carbon atoms when y is a number from 2 to 9. The alkylene radicals may be the same or different.

In the new fast-curing epoxy compositions, which advantageously are adhesives, the curing agent which they contain may be either a primary or secondary amine and may contain two or more amino groups. The active epoxy component of the resinous compositions may be an epoxy compound known to be useful for this purpose but, advantageously, linear polymeric glycidyl polyethers having, on the average, more than one 1,2-epoxy groups per molecule are used as the active epoxy component.

A preferred class of curing agents to be used with the thiirane group accelerators are primary or secondary acyclic polyamines containing four to 16 carbon atoms. With these or other useable polyfunctional amino compounds as curing agents, the catalyzed epoxy resinous compositions of the invention advantageously contain from about 1 to 20 parts by weight of the curing agent and from about 1 to 50 parts by weight of the thiirane compound for each 100 parts by weight of active epoxy component of the resinous composition. Within the given range, large amounts of the thiirane are used in making thin sections, films or laminates. Small amounts of the thiirane are used where thick sections are to be cast, molded and so forth such as in encapsulation due to the large amount of heat generated from the exothermic reaction or where the composition or laminate is to be heated. Additionally, the amount of thiirane compound to be used will depend to some extent on its activity in accelerating the gelling and/or curing of the epoxide.

The following examples will serve to illustrate the present invention with more particularity to those skilled in the art. In these examples and throughout the remaining specification and claims, all parts and percentages are by weight.

EXAMPLE 1

β-Glycidyloxypropionitrile

Acrylonitrile (84 g) and glycidol (74 g) were mixed together with 0.3 cc. of a 25 percent solution of sodium methoxide in methanol. The mixture was heated while agitated to 90°C. and another 1 cc. of the sodium methoxide solution was added as a fine stream under the surface of the reaction mixture over a period of 20 minutes. During this time the mixture refluxed due to exothermic heat and the temperature was maintained between about 90° and 100°C. by the controlled addition of the sodium methoxide solution which acted as a catalyst for the reaction. At the end of the 20 minutes, the temperature receded below 90°C. and after 5 minutes of stirring at the reduced temperature, the mixture was reheated to 100°C. Finally, the mixture was allowed to cool with stirring to room temperature (20°–30°C.) at which time solid $CO_2$ was added to destroy the catalyst. The reaction product was then recovered by vacuum distillation. The main fraction distilled at 90/94°C. at 0.6 mm. Hg. yielding 112.5 g of product (88.6% of theory) and leaving a residue of 4–5 g.

The product was redistilled giving a purified product boiling at 82/83°C. at 0.2 mm. Analysis of the product gave the following data:
Refractive Index $N_D^{25}$ 1.4426
% N: Found 11.00, 11.01 Calc. 11.02
Epoxy content: Found 7.80 millimoles/g. Calc. 7.86.

EXAMPLE 2

Methyl β-glycidyloxypropionate

Methyl acrylate (172 g.) was mixed with 2.8 cc. of a 25 percent solution of $NaOCH_3$ in methanol and the mixture heated to 80°C. There were then added dropwise to the heated mixture 148 g. of glycidol over a period of 15 minutes while the temperature rose to 90°C. The mixture was refluxed for 3.5 hours and then allowed to cool to room temperature. The reaction mixture was next treated with excess solid $CO_2$ to neutralize the catalyst and then heated to 125°C. to distill off unreacted methyl acrylate, 17 g. being recovered. Again the reaction mixture was cooled to room temperature and desired product was recovered by vacuum distillation. After a forerun of 99 g., the main fraction boiled at 70/80°C. at 0.6 mm. with a pot temperature up to 140°C. giving a yield of 131 g. A polymeric residue of 73 g. was obtained.

The main fraction was redistilled and 2 fractions resulted. The first amounted to 61 g. (60°–109°C., 14 mm.) and the second to 70 g. (110°–112°C., 14 mm.). The first fraction was determined by analysis to be glycidyl acrylate formed by transesterification. The second fraction was the desired product. Analysis of this product gave the following data:
Refractive Index: $N_D^{25}$ 1.4360
% H: Found 7.30 - Calc. 7.55
% C: Found 52.59 - Calc. 52.43
Epoxy No: Found 6.25, 6.20 mmoles/g. - Calc. 6.25

The structure for methyl β-glycidyloxpropionate was confirmed by IR Spectrum analysis.

EXAMPLE 3

Isobutyl β-glycidyloxypropionate

The general procedure of example 1 was repeated by reacting 141 g. of isobutyl acrylate with 74 g. of glycidol using 1.4 cc. of 25% $NaOCH_3$ solution as catalyst which was added over 10 minutes at 90°C. The reaction mixture was then slowly heated to 100°C. and kept there for 2 hours. After cooling to room temperature, the reaction mixture was saturated with solid $CO_2$. Upon vacuum distillation of the final cooled reaction mixture, a forerun of 144 g. up to 100°C. at 10 mm. was followed by a product cut of 60 g. at 100/120°C. and 5 mm. leaving a residue of 10 g. The product cut was redistilled and a pure product fraction of 28 g. boiling at 114/117°C. at 5 mm. was recovered. Analysis of this product gave the following data:

Refractive Index: $N_D^{25}$ 1.4362
Epoxy No. Found 4.92, 4.92 Calc. 4.95 mmoles/g.

EXAMPLE 4

2,2'-di-(glycidyloxyethyl)sulfone

A mixture was made of 59 g. divinylsulfone and 74 g. glycidol and heated to 80°C. Over a 5 minute period 0.7 cc. of a 25 percent solution of $NaOCH_3$ in methanol was added streamwise to the heated mixture. The temperature rose to 81°C. and stayed there for 15 minutes. This was then slowly heated to 90°C. when an exothermic reaction began which carried the temperature to 79°C. Cooling was applied to maintain the temperature between 92° and 96°C. When the exothermic heat subsided, stirring was continued for another 10 minutes without cooling, during which time the temperature dropped to 80/85°C. The mixture was then allowed to slowly cool to room temperature with continued agitation. Excess solid $CO_2$ was then added to neutralize the catalyst and the reaction mixture was slowly heated under a vacuum of 1 mm. pressure to a temperature of 120°C. A total of 11 g. of unreacted material consisting mainly of glycidol was removed by this distillation leaving 123 g. of the desired product whose structure was confirmed by IR Spectrum analysis. The epoxy No. for the product was found to be 6.49, 6.50 mmoles/g. (Calc. 7.58) (Assay 85 percent).

EXAMPLE 5

β-Glycidyloxyethylmethyl ketone

A mixture of 74 g. methyl vinyl ketone and 74 g. of glycidol was heated with agitation to 40°C. and 0.2 cc. of a 25 percent solution of $NaOCH_3$ in methanol was added to the mixture. The temperature was raised to 55°C. and 0.5 cc. additional catalyst solution was added streamwise over a period of 15 minutes. The temperature of the agitated mixture was then maintained by controlled cooling between 55° and 60°C. for one hour after which the temperature was allowed to drop to 25°C. The reaction mixture was saturated with $CO_2$ to neutralized the catalyst and then subjected to vacuum distillation. A main fraction amounting to 96 g. and boiling between 52° and 82°C. at 0.1 to 0.3 mm. was recovered. Redistillation of the main fraction yielded 62 g. of desired product boiling at 63/64°C. and 0.3 mm. The refractive index $N_D^{25}$ of the product was 1.4414 and the Epoxy No. was 6.94 (Calc. 6.94) mmoles/gram.

EXAMPLE 6

1,2-epithio-3-(β-cyanoethoxy)propane

A solution of 100 g. of potassium thiocyanate in 150 cc. of water was prepared and to this were added in portions 127 g. of β-glycidyloxypropionitrile. The temperature of the mixture rose to 40/45°C. and the mixture was then maintained in this range for 1.5 hours. Next, 60 g. of NaCl were added and the mixture agitated for 20 minutes. When agitation was stopped, the mixture separated into two layers, the organic layer being on top. The upper layer was separated and it was washed with water until a pH of 6–7 was obtained. The resulting lower organic layer was then separated from the water-wash mass and this product was dried over anhydrous sodium sulfate. The resulting clear organic liquid was filtered and then vacuum distilled at 70°C. and 0.5 mm. pressure to remove low boiling byproduct. The undistilled material was recovered as desired product amounting to 107 g; $N_D^{25}$ 1.4996; %S: found 20.30, 20.89 (Calc. 22.26). Vacuum redistillation at 95/98°C. and 1 mm. gave 100 g. of a purer product having a refractive index $N_D^{25}$ of 1.4974 and percent sulfur of 21.28, 21.20 (Calc. 22.36). The structure of the product was confirmed by IR spectrum analysis.

EXAMPLE 7

Bis-(β-epithiopropoxyethyl)sulfone

A solution of 50 g. of potassium thiocyanate in 75 cc. of deionized water was prepared and to this were added in one batch with agitation 66.5 g. of the product of Example 4. This mixture was stirred at 20°–30°C. for 3 hours. Upon stopping the agitation, the mass separated into two layers. The bottom layer was recovered, washed with 100 cc. water; then 130 cc. chloroform were added, and finally again washed with 100 cc. water. The resulting material containing chloroform and water separated into three layers and the lower layer was recovered and subjected to vacuum evaporation of solvent at 25°C. to give 28 g. of product which by analysis was found to contain 28.89, 28,90 percent sulfur (Calc. 32.22).

EXAMPLE 8

An epoxy resinous composition was prepared by mixing 6 g. of "Epon 828," 3 g. of 2,2'-di-(glycidyloxyethyl) sulfone and 1 g. of diethylenetriamine (DEtA). Pot life of the composition at room temperature was 135 minutes. The "Epon 828" is a commercial epoxy product consisting principally of the diglycidylether of Bisphenol A.

Part of the resinous composition was used to cement together two sections of glass fiber reinforced plastic sheet using a ¾-inch overlap and 20 minutes cure at 80°C. Upon bending of the resulting structure to breakage, failure occurred in the plastic sheet and not in the overlap joint. Another portion of the resinous composition was cured in block form at 80°C. for 20 minutes giving a block with a Shore D hardness of 80.

In another case, 18 g. of "Epon 828," 2 g. of methyl β-glycidyloxypropionate and 1.6 g. of DETA were mixed to from a resinous composition. When cured at 80°C. for 20 minutes, the Shore D hardness was 88.

EXAMPLE 9

This example concerns the acceleration of the curing of epoxy-amine resinous compositions with thiirane terminal compounds having a moiety of the following structure:

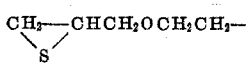

The effect upon rate of cure by specific thiirane terminal compounds was investigated using as a basic composition (control) a mixture of 20 parts Epon 828 and 1.6 parts DETA. This basic composition was then modified by incremental replacement of portions of the Epon 828 with an equal amount of the thiirane compound. In a first series, the thiirane compound (A) was 1,2-epithio-3-($\beta$-cyanoethoxy)propane. Its effect was compared to effect of similar replacement in the basic formula of the oxygen analog (B), namely, $\beta$-glycidyloxypropionitrile. The thiirane compound gave a strong accelerating effect while the oxirane compound lowered the rate of cure of the epoxide composition when cast into aluminum dishes at room temperature (20°–30°C.) as shown by the data on gel time in minutes versus percentage of Epon 828 replacement by the tested compound reported in Table I.

TABLE I

| Compound | Percentage | Gel time |
|---|---|---|
| A | 25 | 6 |
| A | 15 | 15 |
| A | 10 | 50 |
| A | 5 | 98 |
| None | 0 | 112 |
| B | 5 | 150 |
| B | 10 | 203 |
| B | 15 | 270 |

A similar replacement of 20 percent Epon 828 in the control composition with the product of Example 7 using 1.6 parts DETA gave on mixing together at room temperature a cure time of 5 minutes to a hard resin. Two sections of glass fiber reinforced plastic sheets overlap-cemented, as described in Example 8, with this modified resinous composition produced a cemented joint to strong on curing that on bending the cemented structure failure occurred in one of the sheets and not in the joint.

Further examples of epiterminal organic compounds which may be prepared in accordance with the invention include:

hexyl $\beta$-glycidyloxypropionate,
n-propyl $\beta$-glycidyloxypropionate,
methyl $\beta$-glycidyloxyethyl sulfone,
amyl $\beta$-glycidyloxyethyl sulfone,
$\beta$-glycidyloxyethyl butyl ketone,
$\beta$-glycidyloxyethyl hexyl ketone,
$\beta$-epithiopropoxyethyl amyl sulfone,
$\beta$-epithiopropoxyethyl methyl sulfone,
$\beta$-epithiopropoxyethyl methyl ketone,
$\beta$-epithiopropoxyethyl butyl ketone,
$\beta$-epithiopropoxyethyl hexyl ketone,
methyl $\beta$-epithiopropoxypropionate,
hexyl $\beta$-epithiopropoxypropionate,
isobutyl $\beta$-epithiopropoxypropionate,
diethylene ether glycol bis($\beta$-glycidyloxy-propionic acid ester),
1,2-di-($\beta$-glycidyloxypropionate)ethane,
bis($\beta$-glycidyloxyethyl)ketone,
dipropylene ether glycol bis($\beta$-glycidyloxy-propionic acid ester),
triethylene ether glycol bis($\beta$-glycidyloxy-propionic acid ester),
methyl $\beta$-glycidyloxy crotonate,
butyl $\beta$-glycidyloxy crotonate,
triethylene ether glycol bis($\beta$-glycidyloxy crotonic acid ester),
ethyl $\beta$-glycidyloxy-2-pentanoate,
ethyl $\beta$-glycidyloxy-2-hexoate,
1,2-di($\beta$-epithiopropoxypropionate)ethane,
bis($\beta$-epithiopropoxyethyl)ketone,
diethylene ether glycol bis ($\beta$-epithiopropoxy propionic acid ester),
dipropylene ether glycol bis($\beta$-epithiopropoxy propionic acid ester),
triethylene ether glycol bis($\beta$-epithiopropoxy propionic acid ester),
methyl $\beta$-epithiopropoxy crotonate,
hexyl $\beta$-epithiopropoxy crotonate,
triethylene ether glycol bis($\beta$-epithiopropoxy crotonic acid ester),
ethyl $\beta$-epithiopropoxy-2-pentanoate,
ethyl $\beta$-epithiopropoxy-2-hexoate,
methyl $\beta$-glycidyloxy-2-methyl propionate,
ethyl $\beta$-epithiopropoxy-2-ethyl propionate, and
octaethylene ether glycol bis($\beta$-epithiopropoxy propionic acid ester).

As has been illustrated above, the new monomeric oxirane terminal group compounds of the invention are useful as comonomers in the preparation of epoxy resinous compositions. They may constitute the sole epoxy component of such a resinous composition or, advantageously, they will be used in admixture with other epoxy compounds known to be useful as active epoxy components in the production of resinous compositions capable of being cured to a solid state. The preferred type of epoxy material for this purpose is the linear polymeric glycidyl polyethers having, on the average, more than one 1,2-epoxy groups per molecule are preferred. A variety of such epoxy products are commercially available, e.g., Epon 828. Many additional polyepoxy compounds useful in the present invention, capable of forming gels and being cured to solid products, can be prepared by reaction of epichlorohydrin with bis-phenols, e.g., see U.S. Pat. No. 2,506,486. Further examples of epoxy compounds which may be used in forming epoxy resinous compositions are disclosed in U.S. Pat. No. 2,871,217. Please note, also, the prior art disclosure in "Epoxy Resins," Lee and Neville, McGraw-Hill Book Co., Inc., New York, 1957. These, and related equivalent materials, and mixtures thereof, known to be useful in this art, may be employed in preparing epoxy resinous compositions of this invention.

In forming the new terminal oxirane compounds of the invention, glycidol is an essential reagent. The second essential reagent is a vinyl-type compound containing double bonds that are activated by adjacency to the vinyl group of strong electron-withdrawing groups (nitrile, carbonyl, ester and sulfone). Examples of such compounds which may be advantageously used in accordance with the invention in the preparation of the new terminal oxirane compounds include: acrylonitrile, methyl vinyl ketone, hexyl vinyl ketone, butyl vinyl ketone, hexyl vinyl sulfone, methyl vinyl sulfone, divinyl sulfone, methyl acrylate, isobutyl acrylate, divinyl ketone, ethylene glycol diacrylate, propylene glycol diacrylate, diethylene ether glycol diacrylate, dipropylene ether glycol diacrylate, triethylene ether glycol diacrylate, butylene glycol diacrylate, octylene glycol diacrylate, propylene glycol dimethacrylate, ethylene glycol diethacrylate, methyl crotonate, ethylene glycol dicrotonate, methyl methacrylate, ethyl methacrylate, methyl ethacrylate, nonaethylene ether glycol diacrylate, hexyl acrylate, and propyl acrylate and the like and mixtures thereof.

The reaction between glycidol and the vinyl-type compound is conducted in the presence of an alkaline compound. Alkali metal alkoxides are advantageously used for this purpose in the amount of about 0.01 to 2 percent based upon the total weight of reactants, but other basic compounds may be used for this purpose, e.g., alkali metal hydroxides, quaternary ammonium compounds and the like. The addition reaction between the glycidol and the vinyl-type compound can be carried out at various temperatures and under reduced, normal or super-atmospheric pressures. Reaction temperatures between 25°–150°C. and especially 40°–100b℃. have been found advantageous. Reaction times between 0.25 and 8 hours and especially 0.5 to 4 hours, are adequate for completing the reaction. Normally external heat will be applied in order to initiate the reaction and/or to bring it to completion. However, external cooling may be required in some cases to maintain an optimum temperature range for the reaction since with many of the useable reagents, the reaction is rather exothermic.

More of the important features of the invention is the discovery of the utility of terminal thiirane compounds as accelerators for the curing of epoxy resinous compositions, especially such compositions which contain a primary or secondary amine, or mixture thereof, as a curing agent. Examples of polyamino compounds which may advantageously be used in forming the new catalyzed resinous compositions include: diethylene triamine, tetraethylene pentamine, triethylene tetramine, polyethylene imine, 1,6-hexamethylene diamine, bis-hexamethylene triamine, 1,3-diamino-2-propanol, tris-4-piperidyl cyclohexane, phenylene diamine, N-stearyl hexamethylene diamine, benzidine, and 3-ethoxy benzidine and the like.

The new thiirane compound acceleration of amino curing of epoxy resins may be applied to any type of resinous composition containing a active epoxy component capable of being cured to a solid state. Epoxy materials useful in forming such compositions include the oxirane compounds of this invention and other epoxy materials as previously discussed.

Mixtures of two or more of thiirane compounds may be used as the accelerator for the new catalyzed epoxy resinous compositions. Selectivity of such thiirane mixtures can provide controlled curing rates for the resinous compositions at relatively low temperatures, e.g., temperatures between about 10° to 50°C.

The time required for completion of the curing of resinous compositions of the invention depends usually in inverse proportion to the concentration of curing agent and accelerator within the preferred concentrations as hereinbefore defined. Similarly, time of cure is generally inversely proportional, though not necessarily linearly, upon the temperature of the composition during the curing process. As curing occurs, the mass of resinous composition may acquire an elevated temperature, e.g., 50°C. or higher, e.g., 50°–120°C., through the exothermic reaction of the resin curing. Gel times for resinous compositions of the invention may vary between 1 and 60 minutes and complete cure of the resin composition can be attained in generally 0.5 to 12 hours.

The catalyzed resinous compositions of the invention may be formed using any of the mixing techniques and apparatus known to be useful in the epoxy resin art. Advantageously, the active epoxy component of the composition is mixed with the thiirane compound and then when conditions are ready for prompt spreading or other utilization of the resinous composition, the polyamine agent is added and the mixture is homogenized. Complete curing can be obtained with the new compositions without application of external heat.

Resinous compositions of the invention may contain only the three essential ingredients, but it may be advantageous to incorporate other added materials, e.g., fillers, dyes, pigments, plasticizers, extenders, inhibitors, anti-degradants, fire-resistant materials and the like. Examples of materials which fall in these categories and which may be usefully included comprise: zinc oxide, carbon black, iron oxides, clay, chalk, titanium dioxide, silicon dioxide, mica, asbestos, barytes, glass fibers, cellulosic fibers, synthetic fibers, alumina, antimony oxide, zinc borate, synthetic rubbers, polyester resins, polyurethane resins and the like. Such added materials may comprise 0.01 to 125 percent of the total resinous composition and advantageously between about 0.1 and 50 percent.

Catalyzed epoxy resinous compositions of the invention may be employed for any application for which epoxy type compositions are known to be useful. However, the thiirane compound accelerated products are especially useful as adhesives or cements for joining metal to metal, plastic to metal or plastic to plastic as well as in making food trays, pulleys, automobile and truck bodies and parts, helmets, tubing, building panels, boats, auto fender extenders and so forth. The compositions formed from the episulfide and amine curing agent without the epoxide may be used in the same or similar applications.

In addition to their use as components of epoxy resins, the new oxirane compounds of the invention may be used to form homopolymers or copolymers with two or more of said oxirane compounds with themselves, or with one or more of said oxirane compounds to form copolymers with one or more epoxides like propylene oxide, ethylene oxide, butylene oxide, allyl glycidyl ether, crotyl glycidyl ether, vinylcyclohexene monoxide and so forth. Likewise, the thiirane compounds of this invention can be copolymerized with themselves, with the oxirane compounds disclosed herein, or with the polymerizable epoxides and episulfides known to the art to form various homopolymers and copolymers to make plasticizers, resins and rubbers which in turn are useful in making tires, gaskets, valves, o-rings, seals, tarpaulins, protective coatings, belts, hose and the like using conventional polymerization catalysts, e.g., metal alkyls, such as zinc diethyl, aluminum triethyl, aluminum diethyl hydride, alone or in combinations with water, glycols, chelating agents, peroxide compounds and the like, e.g., see U.S. Pat. No. 3,313,740.

The embodiments of the invention in which an exclusive property or privilege is claimed are defined as follows:

1. The compound 1,2-epithio-3-($\beta$-cyanoethoxy) propane.

* * * * *